(12) United States Patent
Hawkes

(10) Patent No.: US 6,366,960 B1
(45) Date of Patent: *Apr. 2, 2002

(54) METHOD AND APPARATUS FOR INTERACTIVELY PROVIDING INFORMATION AT MULTIPLE SITES

(75) Inventor: Calvert T. Hawkes, Sarasota, FL (US)

(73) Assignee: Island Software, Inc., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/710,687

(22) Filed: Nov. 10, 2000

Related U.S. Application Data

(63) Continuation of application No. 07/988,712, filed on Dec. 10, 1992, now Pat. No. 6,161,122.

(51) Int. Cl.$^7$ .............................................. G06F 13/00
(52) U.S. Cl. ..................... 709/233; 709/232; 705/28; 705/20; 707/10
(58) Field of Search ................. 705/20, 28, 1; 709/203, 230, 232, 233; 707/10

(56) References Cited

U.S. PATENT DOCUMENTS

| | | | | |
|---|---|---|---|---|
| 4,888,709 A | * | 12/1989 | Revesz | 358/1.15 |
| 4,964,053 A | * | 10/1990 | Humble | 705/418 |
| 5,198,644 A | * | 3/1993 | Pfeiffer et al. | 235/383 |
| 5,351,186 A | * | 9/1994 | Bullock et al. | 705/1 |
| 5,737,495 A | * | 4/1998 | Adams et al. | 707/104.1 |
| 6,161,122 A | * | 12/2000 | Hawkes | 709/203 |

* cited by examiner

Primary Examiner—Kenneth R. Coulter
(74) Attorney, Agent, or Firm—Wolf, Greenfield and Sacks, P.C.

(57) ABSTRACT

A method and apparatus are provided for interactively providing selected messages asynchronously at a plurality of separate sites. At least one message is stored in an addressable memory for each site and is read out to control the output on an output device for the site in response to die operation of an input device for the site. A plurality of messages may be stored for each site with the message to be read out from the addressable store and provided at the associated output device being selected in response to appropriate operation of the input device. The input device may also be initially utilized to select an appropriate message for a given site and to select a desired volume for the site.

27 Claims, 8 Drawing Sheets

METHOD AND APPARATUS FOR INTERACTIVELY PROVIDING INFORMATION AT MULTIPLE SITES

RELATED APPLICATIONS

This application is a continuation of application Ser. No. 07/988,712, filed Dec. 10, 1992, now U.S. Pat. No. 6,161,122.

FIELD OF THE INVENTION

This invention relates to the interactive provision of selected information at multiple sites and more particularly to a method and apparatus for the asynchronous concurrent provision of requested information at such sites from a central source in response to user initiated information requests.

BACKGROUND OF THE INVENTION

There are many situations where a person located at any one of a number of remote locations or sites at a particular facility may desire selected information concerning either the site or something located at the site. Examples of such facilities include historical sites where users may desire information concerning what happened at particular locations of the site, museums, art galleries, and in particular retail sales establishments. Therefore, the following discussion will be with respect to a retail sales application; however, it is to be understood that the invention is in no way limited to such application.

In large retail establishments such as department stores or discount merchandisers, the trend is to control costs by maintaining a minimum staff of salespeople. Since this frequently requires that a single salesperson cover several departments, not only is it difficult for a patron to find a salesperson when they wish to obtain information on a particular product, but frequently the salesperson, when located, is not knowledgeable concerning the products, and may either be unable to answer questions or may provide incorrect information.

A need, therefore, exists for an improved way to provide information to customers on products being offered for sale. Such information might include, for example, features of the product, limitations on where and how the product may be used, warranty information, special promotional packages for the product, and the like. Further, while price may generally be easily provided on a tag at the location where the product is located, price changes are not always updated at the product site, and this may be a particular problem when a product is moved from one location to another.

To accomplish the above, an improved system is required to provide information to customers at product locations concerning the particular product. Such system should be interactive so as to permit the customer to obtain the particular information he is seeking and needs to be asynchronous so that the message for each customer will start when the customer makes the request, while permitting large numbers of messages to be simultaneously presented. Such a system should also be relatively low cost, should be easy for a customer to use, should permit setup by unskilled store personnel and should be easy to update so that new messages may be provided if, for example, there is a change in the price or promotional package for a given product.

In addition to providing information to customers, retail establishments are also interested in collecting information concerning customers to assess effectiveness of advertising and promotional campaigns, to determine shelf space allocation, and for other purposes. By keeping track of how many customers have sought information on a particular product, the business can determine, for example, the effectiveness of a particular advertising or promotional campaign for such product. The ratio of information requests for a particular product to sales of the product also provides valuable information. Therefore, it is desirable that any system for providing information to customers on products also have the facility for collecting archival information on such information requests.

While systems have existed in the prior art for providing selected information at remote sites, such systems have generally been of two types. The first type are off-line systems where a tape, wire or the like containing a prerecorded message is located at the site and plays the prerecorded message in response to a user request. Such systems are not interactive and are difficult to update when information changes.

The second type of system, which has heretofore been used primarily in connection with providing, for example, a price display for a product, involves connecting a display at the remote site to a central computer which may send messages addressed to the site with price update information. Systems of this general type are described in a number of issued patents including U.S. Pat. Nos. 4,002,886; 4,500,880; and 4,766,295. However, such systems are not interactive, do not have the capability of providing a variety of information messages concerning a product to a customer and do not have the capability of generating and maintaining audit trail information on system use. These systems, therefore, do not either address or overcome the various problems described above which exist at retail establishments.

While the problems described above exist primarily at retail establishments, they may also arise at, for example, an art gallery where patrons may wish information concerning the painter, the style of the art work, the content of the work, the history of the work, or the like, while the gallery wishes to collect information on the popularity of various works and on traffic flow patterns at the gallery. As indicated above, similar problems also exist at museums, historic sites, and the like.

It is, therefore, a primary object of this invention to provide an interactive, asynchronous method and apparatus for concurrently providing desired information at a plurality of remote sites, such information preferably being obtained from a central computer. Another object of the invention is to permit the establishment using the system to obtain audit trail information concerning interest in a particular product or site, traffic pattern, and other useful information.

SUMMARY OF THE INVENTION

In accordance with the above, this invention provides a method and apparatus for interactively providing selected site-specific messages asynchronously at a plurality of separate sites. At least one site-specific message is stored in addressable storing means for each site. An output device is located at at least selected ones of the sites and an input device is located at each site. At least one input device is associated with each output device, with there being an input device and an output device at each site in a preferred embodiment. The reading out of a message for a site is initiated when the input device is operated and proceeds concurrently for all such sites at a rate for each site which depends on the rate at which the information is utilized.

Each read out message is transmitted to the output device associated with the corresponding operated input device and the read out message is utilized to operate the output device to provide the selected message.

A plurality of site-specific messages may be stored for each site with the message to be read out from the addressable store and provided at the associated output device being selected in response to the operation of the input device. The selecting of the output message may be effected by having the input device be operable in a different way for each site specific message, for example, providing a binary switch which may be operated to indicate the desired message, or a menu of message options may be presented at the output device and the input device for the site selectively operating to select a message from the menu. For a preferred embodiment, the output device is an audio output device such as a speaker with audio messages of the menu being sequentially provided by the speaker. The input device may then be operated at selected times relative to the presentation of the message identifying information to select an identified message.

Where the output device is an audio device such as a speaker, an audio control means may be provided for utilizing the input device for a site to control the audio volume of the associated output device. Such audio control means may include a means for storing an audio volume indicative of each site, for initially setting the volume indication for each site to a predetermined low level, for selectively establishing a volume mode for a given site for incrementally increasing the audio volume of the associated output device when the site is in volume mode and the input device for the site is operating and for updating the means for storing to store an indication of the audio volume at the output device when operation of the input device terminates. Once the audio volume has been set, normal operation of the input device causes the audio volume of the corresponding output device to be set at a volume corresponding to the indication stored for the output device. More generally, a means may be provided for storing an indication of a desired output level for each output device, with the operation of the corresponding input device setting the corresponding output device to the indicated output level.

For a preferred embodiment, a memory is provided for storing selected message segments for each site, the memory being loaded from the addressable store with additional message segments for the site when at least a predetermined percentage of the memory means for the site is empty. For a preferred embodiment, the predetermined percentage is approximately 50%. A first and second buffer may also be provided, each buffer being adapted to store a message portion which is shorter than the selected message segment for each site. One of the buffers is loaded from the memory means while the other buffer is utilized to read out messages to the output means. To facilitate rapid initial response, the same initial message portion is loaded into both the first and second buffers for at least selected sites during initialization for the site.

A means may be provided for storing selected information concerning sites in a map, for initially loading information into the map for selected sites and for updating the map with current information concerning each site. The information in the map may include one or more of an address in the addressable store at which the next message or message portion to be read out is stored, a mode in which the site is currently operating and a desired output level for the output device located at the site. Selected audit information concerning operation of input devices and/or other matters may also be stored and may be selectively outputted, for example in response to a request for such information.

A site may also be placed in a message select mode during which an indication of available messages may be outputted by the output device for the site. Operation of the input device for the site at a selected time relative to a given message indication at the site output device causes the designation of the message in the addressable store as the site specific message for the site. This may be accomplished by physically storing the message at an address for the site or by storing a pointer to the message in a site register. Where there may be more than one level of menu indications for a site, the operation of the input device for the site during a given message indication of a first level causes outputting of message indications of a second level which correspond to the given first level message indication.

The foregoing and other objects, features and advantages of the invention will be apparent from the following more particular description of a preferred embodiment of the invention as illustrated in the accompanying drawings.

IN THE DRAWINGS

FIGS. 1A and 1B, when combined as shown in FIG. 1, form a schematic block diagram of an interactive system for providing selective information at multiple sites in accordance with a preferred embodiment of the invention.

DETAILED DESCRIPTION

Figures 1, 1A:
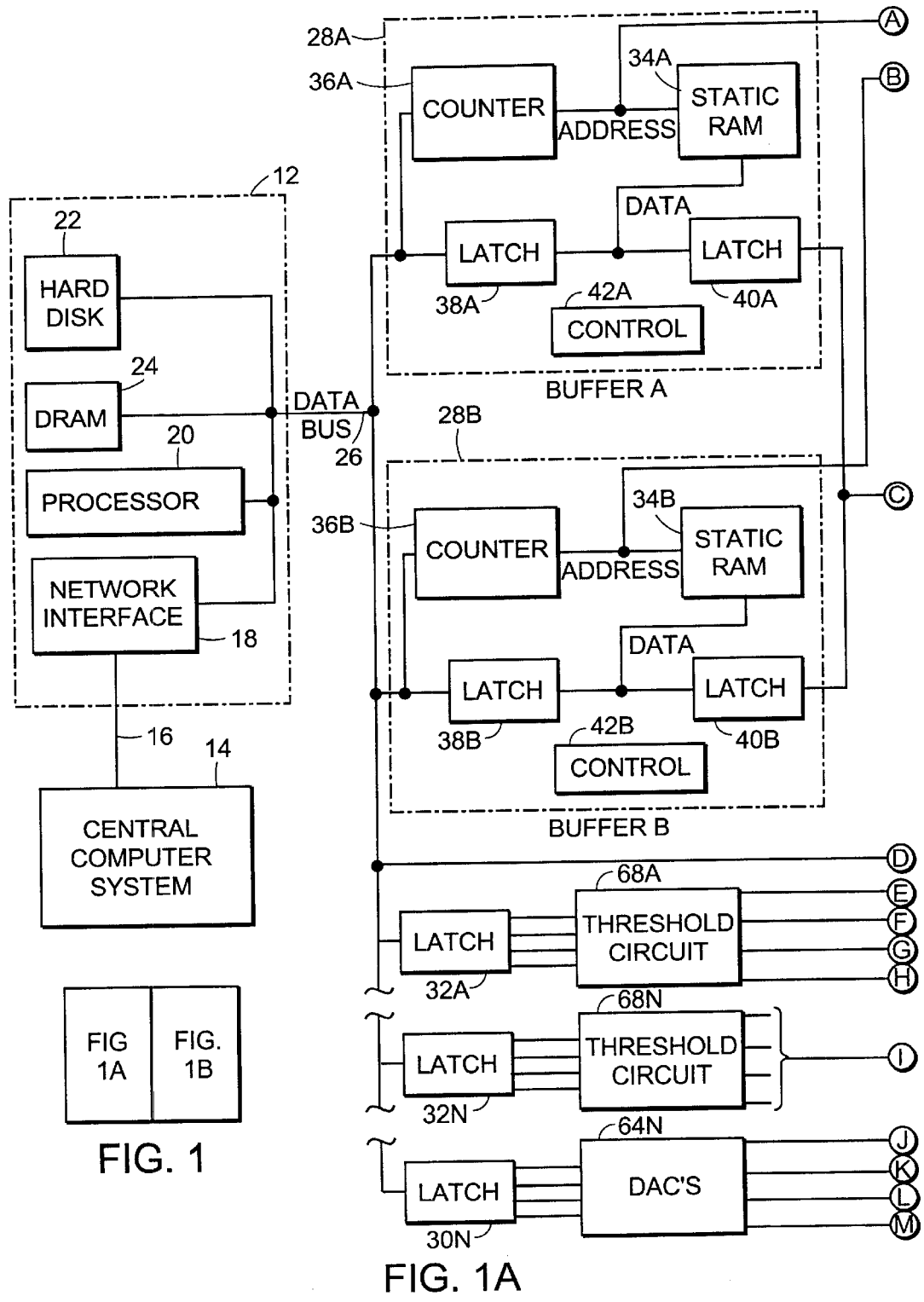
Figure 1B:
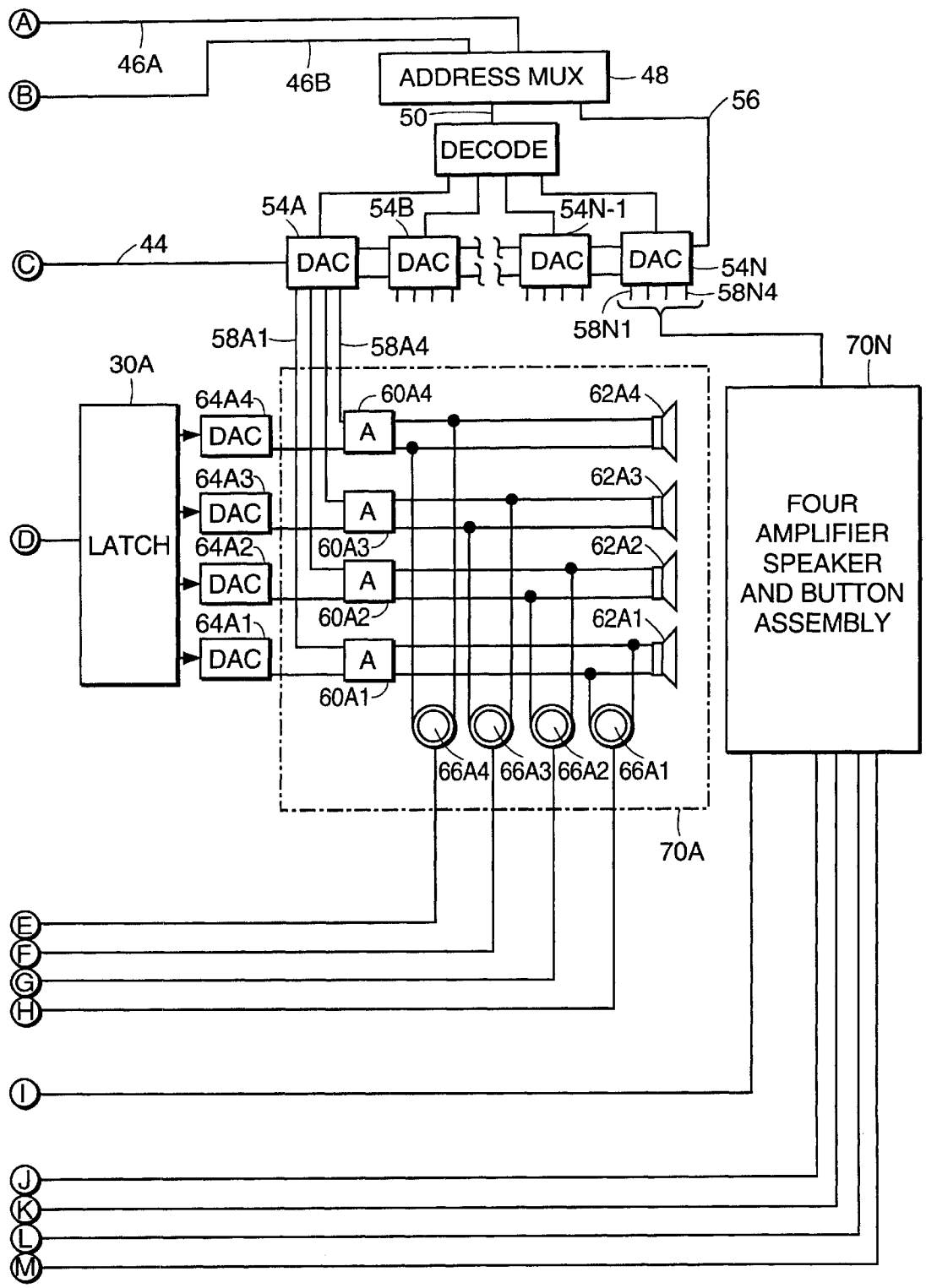

Referring to FIGS. 1A and 1B, the system 10 includes a control computer 12 located at the facility. Computer 12 may be connected to a central computer system 14 which would generally not be located at the facility through communication lines 16 or other suitable means. Control computer 12 has a network interface 18, such as a modem, token ring card or ethernet card through which communications with central computer system 14 are effected, a processor 20, which may be a microprocessor or other standard computer, a bulk storage device 22 which may, for example, be a 20 mb hard disk drive and a fast buffer memory 24 which may, for example, be a 1 mb DRAM. For a preferred embodiment, control computer 12 is a standard personal computer (PC). The elements 18, 20, 22 and 24 communicate with each other through a data bus 26.

Data bus 26 is also connected as an input to a pair of buffers 28A and 28B and as an input to latches 30A–30N. Bus 26 receives outputs from latches 32A–32N.

Each buffer 28 has a memory, for example a static RAM 34A,34B, an address counter 36A,36B, an input data latch 38A,38B, an output data latch 40A,40B and control circuitry 42A,42B. Address information on bus 26 is inputted to an appropriate one or more of counters 36 and is utilized to address the corresponding RAM 34. Data for a buffer 42 is applied through the latch 38 for the buffer to the data bus of the RAM. Latch 38 allows access to the RAM 34 by the processor 20 which loads the RAM with data from the DRAM. Information read out from static RAM 34 is applied through the corresponding output latch 40 to buffer output bus 44.

The address information in address counters 36 is also applied through address buses 46A,46B to address multiplexer 48. Address multiplexer 48 has an output on line 50 to a decoder 52 which selects or addresses one of a plurality of digital-to-analog converters (DAC's) 54A–54N. Each DAC 54 has four individual DAC circuits. Output line 56 from address multiplexer 48 selects the particular one of the four DACS inside each circuit 54 which is to be utilized.

Data bus 44 is connected as an information input to all of the DACS 54. Each DAC in each DAC circuit 54 has an output line 58A1–58N4 which is connected as an input to a corresponding amplifier 60A1–60N4 with only amplifiers 60A1–60A4 being shown in the figure. Each amplifier 60 is connected to control the volume level at a corresponding output speaker 62A1–62N4 (with only speakers 62A1–62A4 being shown in the figure). A jack (not shown) may be provided at each speaker site to which speakers may be removably connected. The speakers are preferably inexpensive speakers such as the 2" speakers used on small portable cassette players.

The gain of each amplifier 60 is controlled by the output from a corresponding DAC 64A1–64N4, the inputs to DACS 64 being the outputs from corresponding latches 30. The outputs from amplifiers 60 are also connected across buttons or input devices 66A1–66N4 to provide a potential across the buttons. The outputs from buttons 66 are connected as inputs to threshold circuits 68A–68N with the outputs from threshold circuits 68 being connected as the input to the corresponding latches 32. A threshold circuit 68 detects a very high impedance (open circuit) when the corresponding speaker is not connected to a jack, a low impedance, for example eight (8) ohms when the speaker is connected but the corresponding button 66 is not operated, and substantially no impedance (a closed circuit) when the button is closed.

In, for example, a retail environment, speakers 62 and buttons 66 would be distributed at locations throughout the store where merchandise is being displayed. To enhance flexibility, speaker jacks might be provided at more locations than the system is adapted to handle, with the speaker being plugged in at a given location when there is merchandise at the location or site on which information is available through the system. For example, a speaker might not be plugged for soft goods such as clothing or commodities such as soap or paper goods at a shelf location, but would be plugged in for shelves containing goods such as radios, televisions, toasters, cameras and the like. For preferred embodiments, there is a button 66 at each site which is preferably permanently installed with their being a speaker jack for each button. However, in some applications, it may be possible to service several buttons with a single speaker.

Latches 30 and 32, DACS 64 and threshold circuits 68 may be located at the same central site as control computer 12, but are preferably distributed at locations in the facility relatively close to the speakers and buttons they are servicing to reduce the amount of wiring. Buffers 28 would typically be located at the same location as computer 12. Communications at the facility would typically be over telephone wires, but fiber optic cables could be used for long communication runs.

Figure 2A:
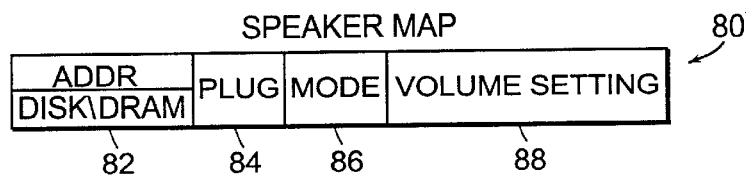
FIGS. 2A, 2B and 2C illustrate the contents of various registers utilized in conjunction with this invention.
Figure 2B:
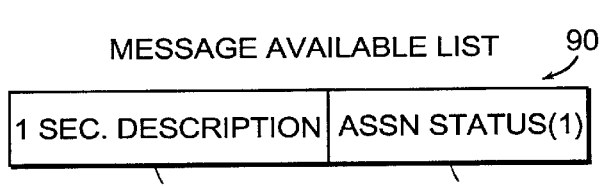
Figure 2C:
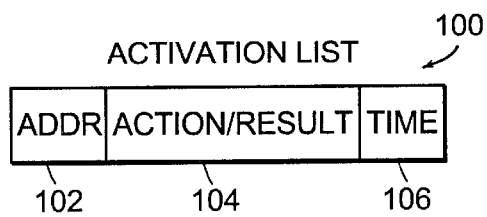

FIGS. 2A–2C illustrate the format for three tables utilized in conjunction with tile invention. These tables may be stored in hard disk 22, but are preferably stored in DRAM 24 for easier access. FIG. 2A shows the format for speaker map 80. Speaker map 80 has an address location for each speaker 62, and preferably for each speaker jack where there are more speaker jacks than speakers. Each address position in speaker map 80 has four fields, an address field 82, a plug field 84, a mode field 86 and a volume setting field 88. Address field 82 contains address pointers in disk 22 and DRAM 24 for the next message or message portion from such memory to be read out for the given speaker. Field 84 is a single bit indicating whether a speaker is plugged in or unplugged at the given location. As will be described in detail later, there are a variety of modes which the system may be in for each individual site or speaker. Mode bits 86 indicate the current mode for the given speaker. For the preferred embodiment to be described, with five possible mode setups, three mode bits are required. Volume setting field 88 indicates a desired gain for the amplifier 60 for the given site. The manner in which this field is set will be described later.

Message available list 90 has an address position for each message stored on hard disk 22. While there may be 64, 128, 256, etc. speaker locations on the system, there may be more than this number of messages on hard disk 22 since some messages in the system may be for products which are not currently being displayed. Field 92 of each message available list entry contains data which results in a one second description of the message being presented at a speaker 62. For example, a message might be "Sony TV Model 19X52". The manner in which such messages are utilized will be described later. Field 94 of each message available entry 90 is a one bit field indicating whether the given message has been assigned to a speaker or not.

Activation list 100 provides an audit trail of activities on the system which, as will be described later, may subsequently be outputted to central computer system 14. An entry in this list has a field 102 which contains the speaker address or other identifying information for the site at which a transaction occurred, a field 104 indicating what happened at the site (for example, what message was requested), and a field 106 indicating die time of the transaction. Depending on how frequently the activation list is interrogated and how precise the time information is desired, time field 106 may only contain minutes, may contain minutes and seconds, may contain hours and minutes, or may also include date information.

In operation, the system 10 is first initialized to build a speaker map and to do an initial loading of DRAM 24 and buffers 28. Once initialization has been completed, the system starts running a mainline routine during which it determines if there is information to be loaded from central computer system 14 or whether information is to be sent to the central computer system. The system also checks during the mainline program to determine if DRAM 24 for a speaker channel requires more information from hard disk 22, and loads additional information into a channel of DRAM 24 if required.

The mainline routine is periodically interrupted, for example, at 250 millisecond (¼ second) intervals, by, for example, an interrupt generated by a control 38 of a buffer 28. During an interrupt, each channel in the system is interrogated to determine the mode that it is in and action is taken for the channel which is appropriate for such mode.

The basic modes which the system may be in are setup mode, idle mode, and message mode. Setup mode occurs when a speaker is first plugged in. Setup mode has two submodes, message select mode and volume mode. During message select mode, the one second description from the message available list (FIG. 2B) is played until the message for the product on the shelf is located and the person plugging in the speaker presses button 66 for the site to cause this message to be assigned to die channel or speaker. During volume mode, the person doing the operation presses the corresponding button 66 as volume increases from an initial, inaudible level until a desired volume level output is achieved. The button is then released, causing an indication of the current volume level to be stored in field 88 (FIG. 2A) of the speaker map entry 80 for the site.

From setup mode, the system goes to idle mode for the site. During idle mode for a given site, a determination is made as to whether the button 66 for the site is pressed. If the button is pressed, the gain for amplifier 60 for the site is set so as to produce the volume of the corresponding volume setting 88 and mode field 86 for the site is set to message mode. If the button is not pressed, the system is interrogated to determine if the speaker is unplugged. If the speaker is unplugged, the assigned status bit for the message which was at that site is sent to the available status, the volume is turned off for the site, volume setting 88 being set to a low level, and the mode bits 86 for the site are set to setup mode.

When the system is in message mode, the first determination is whether the system is also in interactive mode for the channel. If more than one message is available for the given channel, when the channel enters message mode, it automatically also enters interactive mode. In interactive mode, segments identifying each available message for the site are played. In a retail environment, such messages might, for example, be warranty, promotions, specification, etc. In an art museum setting, such messages might, for example, be artist, subject, period, style, etc. When a message segment the user is interested in is mentioned, the user operates the corresponding button 66, causing the message pointer in field 82 to advance to the appropriate message and placing the system for the channel in non-interactive message mode. In non-interactive message mode, the message continues to run, with additional one quarter second or other appropriate message segments being loaded from DRAM 24 into the appropriate buffer 28 during successive interrupts until the message is done. When the message is done, volume for the channel is set off by turning off the gain on the appropriate amplifier 60 and mode field 86 for the channel is set to idle mode.

A more detailed description of system operation will now be presented in conjunction with the flow diagrams of FIGS. 3–8.

Figure 3:
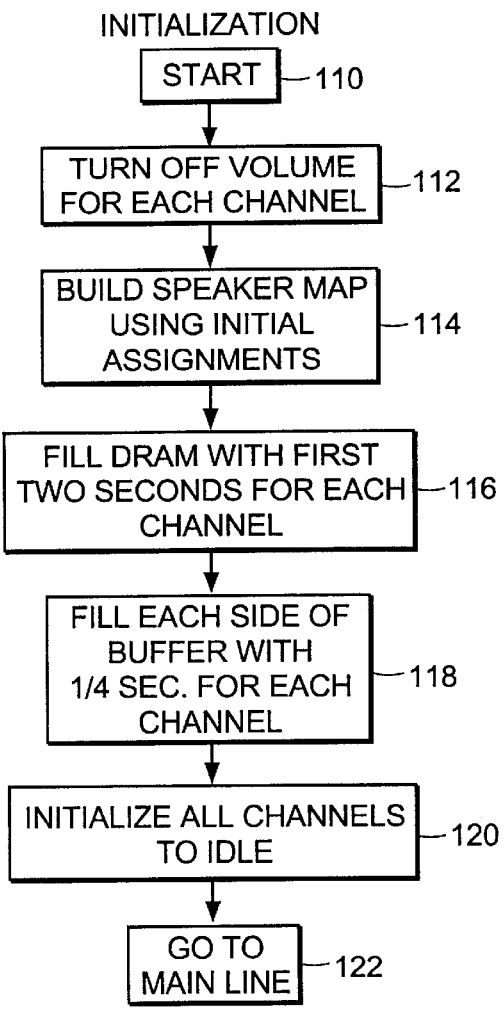
FIG. 3 is a flow diagram of an initialization routine in accordance with the teachings of this invention.

Referring first to FIG. 3, a flow diagram of the initialization routine which would run on processor 20 is shown. Start step 110 of the initialization routine is entered generally in response to an input from a user that initiation of system 10 is to begin. Once initiation begins, the operation proceeds to step 112 to turn off the volume for all amplifiers 60. Step 112 may involve two steps. The first is setting the volume indication in field 88 of each speaker map entry 80 to either zero or a predetermined low value, preferably below audible detection. It may also involve sending signals through data bus 26, latches 30 and DACS 64 to turn down the gain of all amplifiers 60 to a zero or subaudio level.

From step 112, the operation proceeds to step 114 to build speaker map 80 using initial assignments. This step may be performed in a variety of ways. In its simplest form, a disk may be provided at the site containing initial assignments for the speaker map. This would be doable where a retail chain has substantially the same layout for most of its stores or where a predetermined layout has been done for a given store. Alternatively, initial information may be provided from central computer system 14 through network interface 18 to be stored in DRAM 24 and/or hard disk 22. Another way the initial assignments could be accomplished would be to place all channels in setup mode and to execute the setup routine in a manner to be described later at each site or speaker location to make the speaker map entry 80 for that location. Techniques for shortening the duration of this procedure in the event it need be performed will be discussed in conjunction with the discussion of setup mode.

Once the initial assignments have been completed, regardless of how this function is performed, the operation proceeds to step 116 to fill DRAM 24 with a first segment of predetermined duration, for example two seconds, for each active channel. This transfer is accomplished through bus 26 under control of processor 20 and is basically a standard PC memory copy operation. When step 116 has been completed, the operation proceeds to step 118 to fill both buffers 28 with the first portion of predetermined length, for example one quarter second, for each channel. The same initial information is initially loaded into the status RAM 34 of both buffers 28 during step 118 so that, as will be discussed later, readout of the buffer to control output at the speaker may occur during the first interrupt after a button is pushed, regardless of which buffer is then being read out. Once step 118 has been completed, the operation proceeds to step 120 to set the mode field 86 of each entry 80 in the speaker map to the idle mode. Once step 120 has been completed, the initialization routine is over and the operation proceeds to step 122 to call in the mainline routine.

Figure 4:
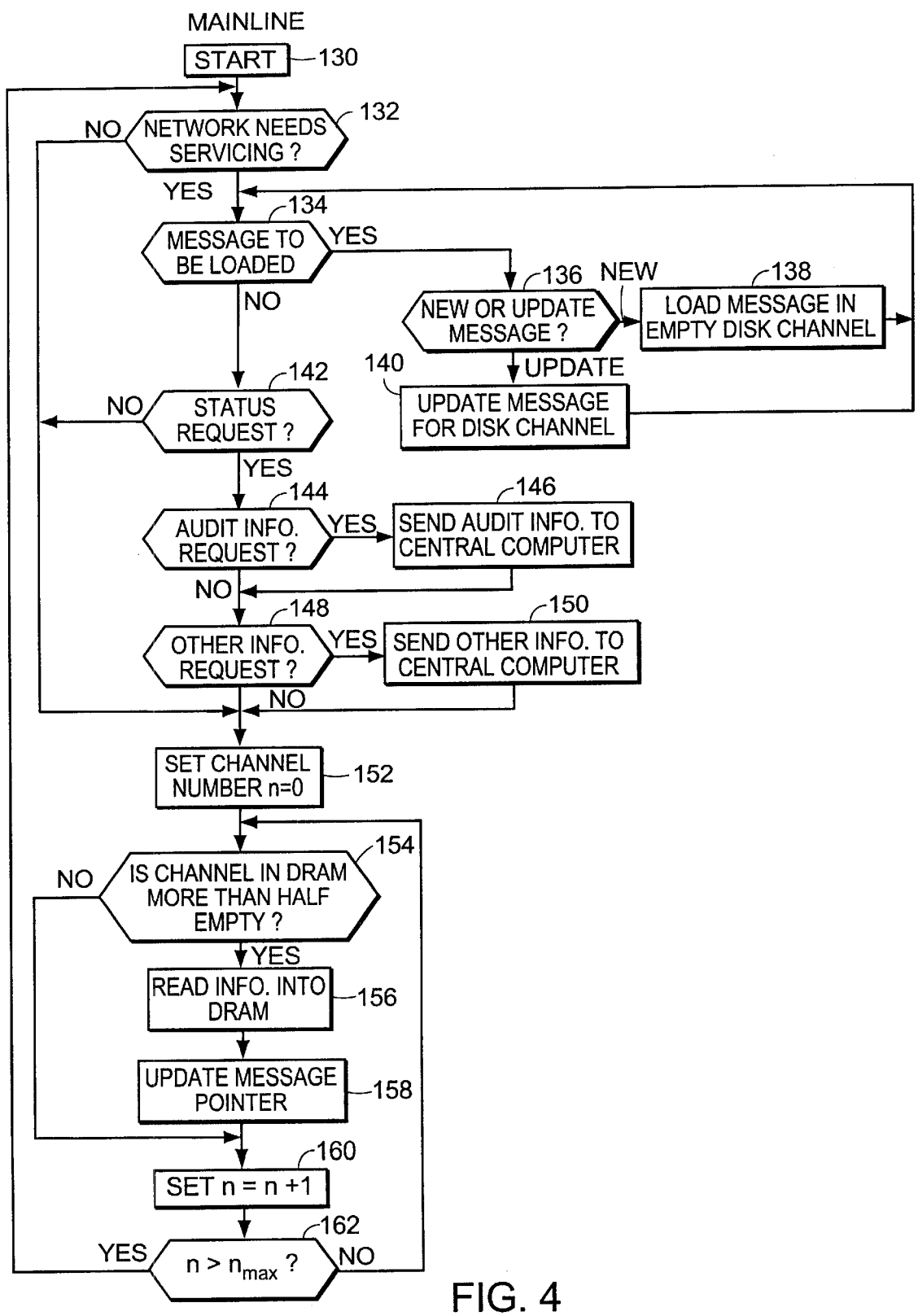
FIG. 4 is a flow diagram of a mainline routine for a preferred embodiment of this invention.

FIG. 4 is a flow diagram of the mainline routine which is entered through step 130. The next step in this operation is step 132 during which a determination is made as to whether the network needs servicing. In particular, a "yes" output is obtained during step 132 if network interface 18 has information from central computer system 14 which is to be loaded into computer 12 or if central computer system 14 wishes to receive audit or other information from computer 12. In order to eliminate or minimize tampering, computer 12 originates all calls to central computer system 14, computer 12 being programmed to connect with the central computer system periodically to report on usage and to accept new messages. A "yes" output will therefore typically be obtained during step 132 when such a program connect is to occur. At all other times, a "no" output will be obtained during step 132.

If a "yes" output is obtained during step 132, the operation proceeds to step 134 to determine if central computer system 14 has a message to be loaded into computer 12. If a "yes" output is obtained during step 134, the operation proceeds to step 136 to determine if the message is a new message or an update to an old message (i.e. for example, a price change). If the message is a new message, the operation proceeds to step 138 to load the new message into an empty channel on disk 22. To the extent the new message also includes information concerning a speaker assignment, a new entry may be made in speaker map 80. The new message would also be added as an entry in the message available list 90 (FIG. 2B). Conversely, if during step 136 an update output is obtained, the operation proceeds to step 140 to update the message on the appropriate disk channel.

From either step 138 or 140, the operation returns to step 134 to determine if another message is to be loaded. If another new message is to be loaded, step 136 and either step 138 or 140 are repeated and this loop is continued until, during step 134, a "no" output is obtained.

When a "no" output is obtained during step 134, the operation proceeds to step 142 to determine if there is a status request from the control computer system 14. If there is a status request, the operation proceeds to step 144 to determine if the status request is a request for audit information. If the request is a request for audit information, the operation proceeds to step 146 to send audit information, for example, the current contents of activation list 100 (FIG. 2C) through network interface 18 to control computer system 14. Either from step 146, or from step 144 if a "no" output is obtained, the operation proceeds to step 148 to determine if other information is requested by the central computer system. Such information might, for example, be a current copy of the speaker map or other information being collected by system 10. If there is a "yes" output during step 148, the operation proceeds to step 150 to send the other information to central control system 14.

A "no" output during step 132, a "no" output during step 142, a "no" output during step 148 or the completion of step 150 causes the mainline routine to go to step 152 during which a channel number register for the mainline routine is set to zero. From step 152, the operation proceeds to step 154 to determine if the channel in the DRAM 24 corresponding to the channel number in the mainline channel register is more than half empty. If during step 154 a "yes" output is obtained, during step 156 additional information is read from hard disk 22 into DRAM 24 for the appropriate channel to fill the DRAM channel. The operation then proceeds to step 158 to update the message pointers indicating the next information to be read from hard disk 22.

If there is a "no" output during step 154, or after completion of step 158, the operation proceeds to step 160 to increment the channel number in the mainline channel register and a determination is then made during step 162 as to whether this incremented channel number is greater than a number $n_{max}$ which is the highest channel number in the system. Thus, if there were 128 channels in the system, $n_{max}$ would be 127. If a "no" output is obtained during step 162, meaning that there are additional channels which need to be interrogated to determine if the corresponding DRAM channel requires additional information, then the operation returns to step 154 to check the new DRAM channel and to steps 156 and 158 if this DRAM channel requires additional information. Steps 160 and 162 are then repeated for the new n number and this process is repeated until, during step 162, it is determined that all channels have been looked at and a "yes" output is obtained. This causes the operation to return to step 132 to begin a new cycle of the mainline routine.

Figure 5:
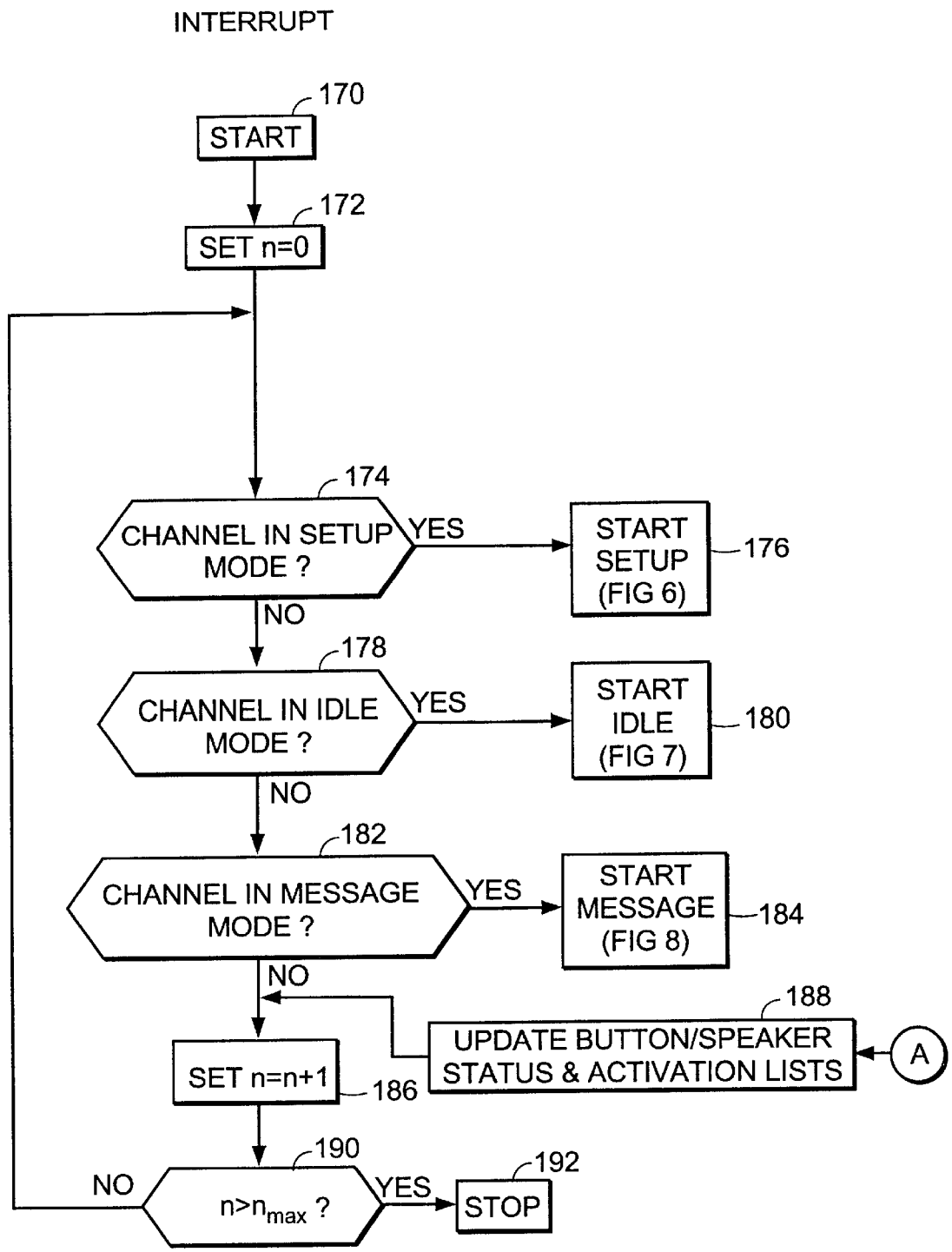
FIG. 5 is a flow diagram of an interrupt routine for a preferred embodiment of the invention.

The mainline routine thus repeats in an endless cycle unless interrupted by an interrupt signal either from processor 20 itself or from a buffer control 42. For a preferred embodiment, such interrupts occur every 250 milliseconds. However, the frequency of such interrupts may vary with application. FIG. 5 is a flow diagram of the operations which are perfomed when an interrupt occurs.

An interrupt, which is entered through step 170, begins with step 172 during which an n register for the interrupt routine is set to zero. The operation then proceeds to step 174 to determine if the channel indicated by the number in the channel register is in SETUP mode. This is accomplished by looking at mode field 86 in the speaker map entry 80 (FIG. 2A) for the channel. If the channel is in SETUP mode, a "yes" output is obtained during step 174, causing the operation to proceed to the SETUP routine shown in FIG. 6 (step 176). The SETUP routine will be described shortly. A "no" output during step 174 causes the operation to proceed to step 178 during which a determination is made as to whether the channel is in IDLE mode. This is again determined by looking at mode field 86 for the appropriate channel entry in the speaker map. A "yes" output during step 178 causes the operation to branch to the IDLE routine (FIG. 7) through step 180. The IDLE routine will also be described later. A "no" output during step 178 causes the operation to proceed to step 182 during which a determination is made as to whether the channel is in MESSAGE mode. A "yes" output during step 182 causes the system to enter MESSAGE mode for the channel through step 184. The message routine will also be described later. A "no" output during step 182 causes the operation to proceed to step 186 to increment the value in the n register by one so that a mode check may be performed on the next channel. When the system exits the SETUP routine, IDLE routine or MESSAGE routine, it returns to the INTERRUPT routine for the channel through step 188 to step 186. During step 188, appropriate activation list entries are made for actions taken during the routine which was just completed.

When step 186 has been completed, regardless of how it is entered, the operation proceeds to step 190 to determine if all channels have been looked at. If all channels have not been looked at, the operation returns to step 174 to determine the mode for the new channel and to execute the appropriate subroutine. This sequence of operations is repeated until all channels have been looked at during the interrupt. When all channels have been looked at, a "yes" output is obtained during step 190, causing the operation to proceed to step 192 to terminate the interrupt and permit the mainline routine (FIG. 4) to resume.

Figure 6:
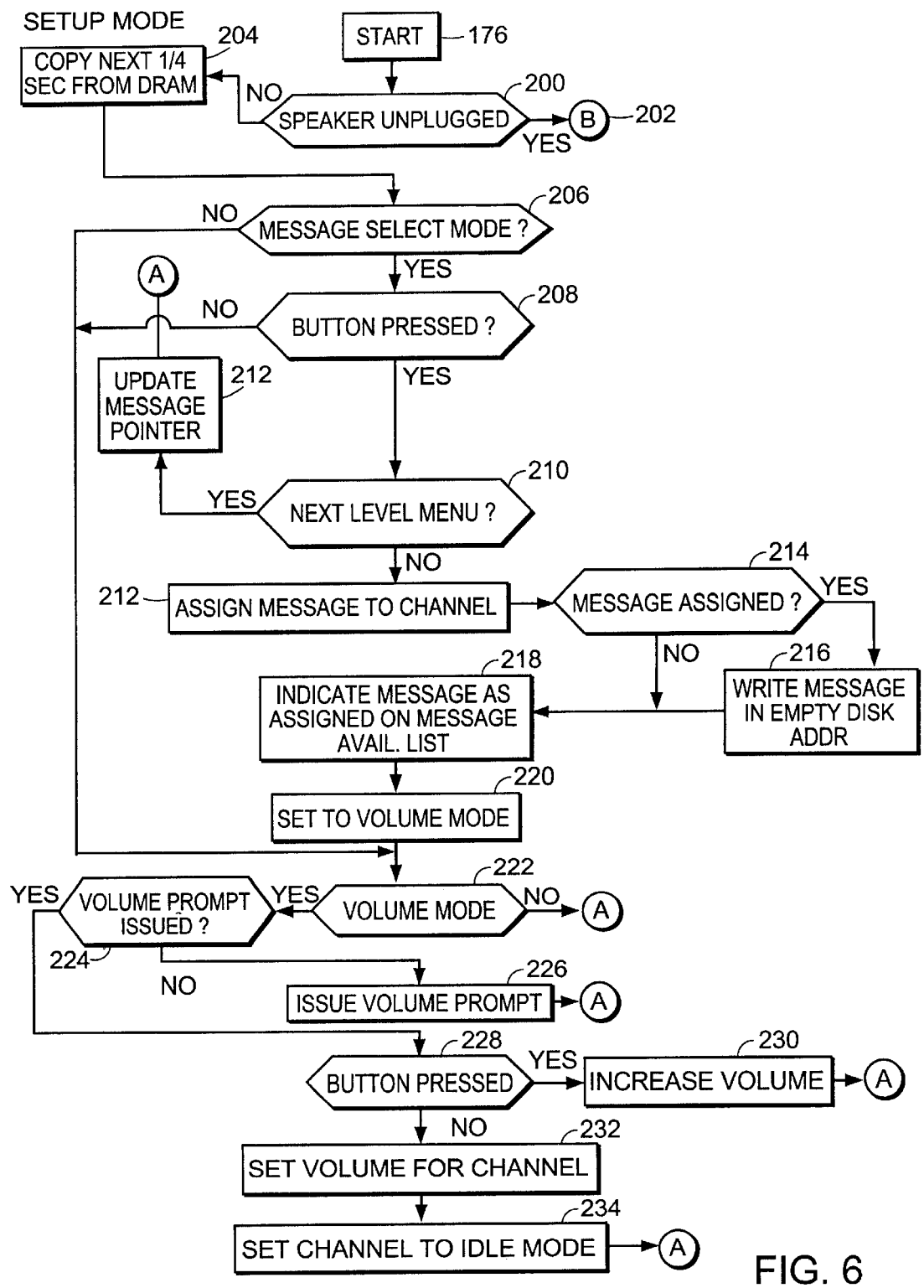
FIG. 6 is a flow diagram of a setup routine for a preferred embodiment of the invention.

Referring now to FIG. 6, SETUP mode is entered through step 176 (also see FIG. 5). From step 176, the operation proceeds to step 200 to determine if the speaker for channel n is unplugged. This would mean that there is a jack for the channel, but that a speaker 62 is not plugged into the jack. The system determines whether a speaker is plugged in by monitoring the impedance indication at the corresponding latch 32. As previously discussed, each threshold circuit 68 detects three levels of impedance, the highest level being when the corresponding button 66 is open and there is no speaker attached for the channel. When a speaker is attached, the impedance on the line is reduced to an intermediate level and this level is reduced to a much lower level when the corresponding button 66 is operated. The determination during step 200 may be made by detecting the impedance level at the corresponding threshold circuit or the value in the corresponding latch 32. Alternatively, when a speaker is unplugged, the output at latch 32 is detected by processor 20 which makes the appropriate change to the plug bit in field 84 of the speaker map entry for the channel. Step 200 would then merely be a check of field 84 for the channel n.

If during step 200 it is determined that the speaker is unplugged, the operation proceeds to step 202 in FIG. 7, which operation will be described later. If a "no" output is obtained during step 200, meaning that a speaker is plugged in for the channel, which is the usual situation, the operation proceeds to step 204 during which the next onequarter second of a description from field 92 of the message available list (FIG. 2B) is read from DRAM 24 into one of the buffers 28, and in particular into the appropriate channel in the static RAM 34 thereof This material will be used in a manner to be described shortly during the message select mode.

From step 204, the operation proceeds to step 206 to determine if the channel is in message select mode by looking at field 86 (FIG. 2A) of the speaker map entry 80 for the channel. If the channel is in message select mode, the operation proceeds to step 208 to determine if the corresponding button 66 is pressed or operated. The way that message select mode operates is that the one second descriptions from the message available list, at least for messages which are not assigned, are played in sequence until the person doing the setup presses the corresponding button 66 during or after the playing of the message, indicating that the message is for the product at the site. Since interrupts occur at approximately one-quarter second intervals, the loading of the buffers 28 during step 204 occurs at a frequent enough interval so that messages appear to be substantially continuous. The first time step 204 is performed, the one-quarter second interval is loaded into the buffer then being written into, with the buffers being operated in ping-pong fashion thereafter so that one buffer is being loaded while the other one is being read out.

One problem with the mode of operation discussed above is that, particularly during initial setup, there may be a large number of messages in the message available list which must be run through before the desired message is presented. Step 210 indicates one way in which this process can be shortened. During step 210, a determination is made as to whether the menu is a multilevel menu. For example, a first level of menu could be the type of product, for example, a TV set, toaster, camera, etc. Assuming the user selected "TV sets", a second level menu could be manufacturers (i.e. Sony, Toshiba, etc.). A third level menu could then be model number. Another alternative might be to have a first level menu be department number, with the remaining three levels indicated above. Therefore, if during step 210 it is determined that the menu is a multilevel menu, the operation proceeds to step 212 to update the message pointer to the beginning of the next menu level and to then exit the SETUP mode through a return to the INTERRUPT routine. The next time the INTERRUPT routine reaches the channel, and enters the SETUP mode routine, the quarter second of information read out during step 204 will be for the next level of menu indicated by the updated message pointer.

If a "no" output is obtained during step 210 indicating that there is not a next level menu, the operation proceeds to step 212 to assign the selected message to the channel. During step 214, the next step in the operation, a determination is made as to whether the message which was selected has already been assigned to another channel. Typically, this will not occur, and in fact messages which are assigned may not even be looked at during the message select mode. However, there are situations where the same product may be displayed in more than one location. For example, a popular item may be displayed both in its regular position on the shelf and in a special display at the end of the counter. It is also possible that a popular item may take up shelf space extending over two or more speaker plugs. When this occurs, since it is desired to play the message asynchronously for each channel, it is necessary to write the message into an empty area of disk 22 which will then be assigned to the channel. In other words, the same message will appear in two different address locations on disk 22. Alternatively, the message may appear at only a single address location, but separate pointers may be provided to this message for each channel. This operation is scheduled during step 216.

From step 214, if there is a "no output" during the step or from step 216, the operation proceeds to step 218 to set tie assigned status bit in field 94 of the corresponding entry 90 in the message available list. From step 218, the operation proceeds to step 220 to set the channel to volume mode.

From step 206, if there is a "no" output, from step 208 if there is a "no" output, or from step 220, the operation proceeds to step 222 to determine if the system is in volume mode for the channel. If the channel is not in volume mode, then the operation returns to the interrupt routine through step A. However, if the channel is in volume mode, a "yes" output is obtained during step 222, causing the operation to proceed to step 224 to determine if a volume prompt has been issued. This would be an oral prompt to the user which might state "Press and hold button to increase volume". If a volume prompt has not been issued, the operation proceeds to step 226 to load a volume prompt, or at least the first ¼ second of a volume prompt, from DRAM 24 into the buffer 28 then being written into at the address for the channel in DRAM 24. If the volume prompt is one-quarter second or less in duration, this operation can be completed during a single interrupt. If the volume prompt is longer than one-quarter second, two or more interrupts may be required to complete the loading of this message into the buffers and the playing of the prompt. From step 226, whether the volume prompt is completed during this step or not, the operation returns to the interrupt routine through step A.

When during step 224 it is determined that the volume prompt has been fully issued, the operation proceeds to step 228 to determine if the corresponding button 66 is depressed. If the button is being operated, the volume is incrementally increased (i.e. the volume setting in the field 88 of the speaker map entry 80 for the channel has its value increased and the gain for the corresponding amplifier 60 is correspondingly increased) (step 230). From step 230, the operation returns to the interrupt routine through step A. This sequence of operations is repeated through successive interrupts for the channel, with the volume being incrementally increased during each interrupt until, during an interrupt, it is determined that the button 66 for the channel is no longer pressed. When this occurs, a "no" output is obtained during step 228, causing the operation to proceed to step 232 to set the volume for the channel at the level then stored in field 88 for the channel.

The operation then proceeds to step 234 to set the mode field 86 for the channel to IDLE mode and then returns to the interrupt routine through step A.

Figure 7:
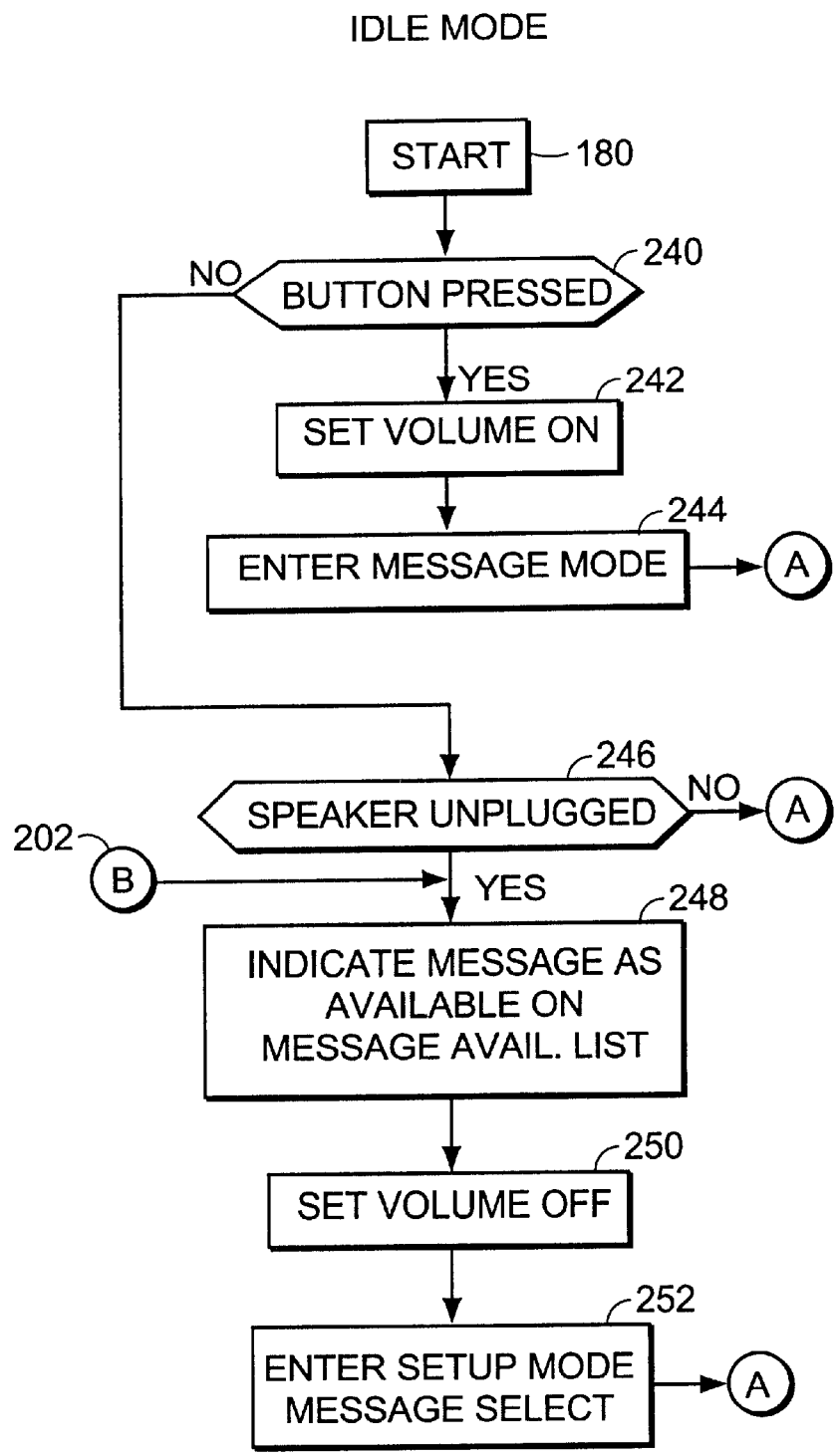
FIG. 7 is a flow diagram of an idle mode routine for a preferred embodiment of the invention.

Referring to FIG. 7, die IDLE mode is entered through step 180 (also see FIG. 5). The system is in IDLE mode for a channel when setup for the channel has been completed, but a store patron or other user has not pressed the button 66 for the site. Therefore, the first step of die IDLE mode routine, step 240, is to determine if the button 66 for the channel or site has been pressed. If the button has been pressed, the operation proceeds to step 242 to turn on the volume for the corresponding speaker 62. This is accomplished by loading the volume setting in field 88 of speaker map 80 for the channel into the corresponding latch 30. This value is applied to the corresponding DAC 64 to set the gain of the corresponding amplifier 60 to the proper level.

From step 242, the operation proceeds to step 244 to set mode field 86 of the speaker map entry 80 for the channel to the MESSAGE mode. Once step 244 has been completed, IDLE mode is exited through step A, with the routine returning to the INTERRUPT routine. It is noted that the detection of a button 66 being operated would cause an audit entry to be made in the activation list 100 during step 188 (FIG. 5).

If during step 240, it is determined that a button has not been depressed, so that the system should stay in IDLE mode, the operation branches to step 246 to determine if the speaker 62 for the channel has been unplugged. The manner in which a speaker being unplugged is detected has been previously discussed. If during step 246, it is determined that the speaker has not been unplugged, the channel remains in IDLE mode and the IDLE mode routine is exited through step A. If a "yes" output is obtained during step 246, the operation proceeds to step 248 to set or reset the message available bit in field 94 of the message available list entry 90 for the message to indicate that the message is available. It is noted that step 248 may also be entered through step 202 from either the setup mode (FIG. 6) or the message mode (FIG. 8).

From step 248, the operation proceeds to step 250 to turn the volume off for the channel by setting the gain for the corresponding amplifier 60 to zero or another predetermined low level. The operation then proceeds to step 252 to set die mode field 86 for the channel to SETUP mode/message select. From step 252, the IDLE mode routine is exited through step A, the operation returning to the INTERRUPT routine.

Figure 8:
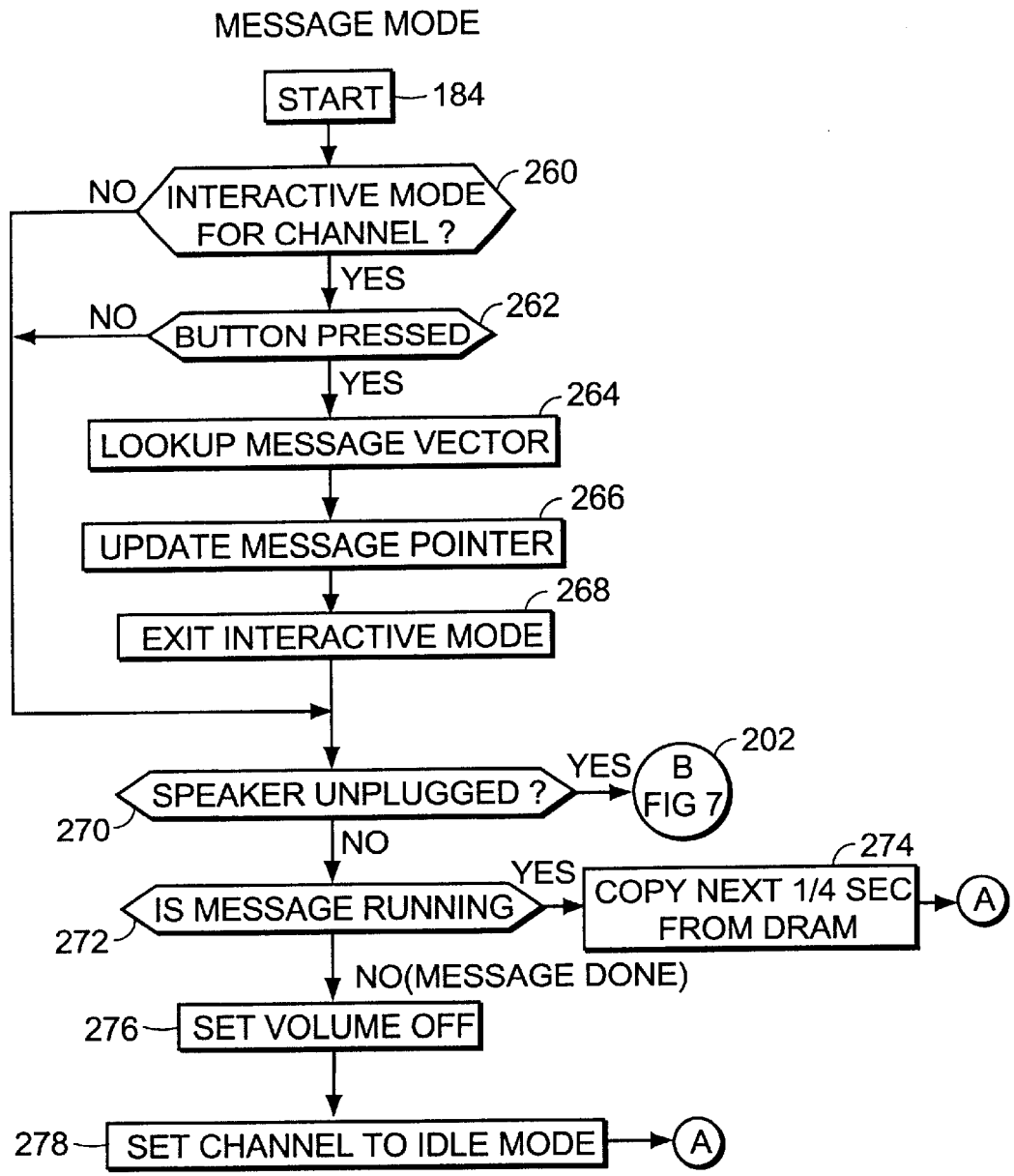
FIG. 8 is a flow diagram of a message mode routine for a preferred embodiment of the invention.

Referring to FIG. 8, the MESSAGE mode is entered through step 184. The first step in the MESSAGE mode is to determine if the channel is also the INTERACTIVE mode (step 260). When a channel is set to MESSAGE mode during step 244 (FIG. 7), it will be sent to INTERACTIVE MESSAGE mode if the channel has two or more available messages and will not be in INTERACTIVE mode if there is only a single message for the channel. Assuming there are two or more messages for the channel, so that the channel is initially set in INTERACTIVE mode, a "yes" output is obtained during step 260, causing the operation to proceed to step 262 to determine if a button is pressed. For a channel with multiple messages, the first part of the message for the channel is an identification of available messages. As previously indicated, such messages may, for example, be warranty, promotions, features, etc. which are loaded from disk 22 into DRAM 24 and from DRAM 24 into buffer 28 in the manner previously indicated. Therefore, if a button is pressed when the system is in interactive mode, it means that the user is selecting the option which has just been presented. Therefore, the operation proceeds to step 264 to look up the message vector for the selected option and then to step 266 to use the message vector to update the message pointer in field 82 of the speaker map for the channel. When step 266 has been completed, the operation proceeds to step 268 to reset the mode field 86 of the speaker map entry 80 for the channel so as to exit INTERACTIVE mode, but to remain in MESSAGE mode.

From step 260, if a "no" output is obtained, from step 262 if a "no" output is obtained, or from step 68, the operation proceeds to step 270 to determine if the speaker 62 for the channel is unplugged. If the speaker is unplugged, the operation proceeds through step 202 to step 248 (FIG. 7) to perform the operations previously described which are required when a speaker is unplugged. Assuming the speaker is not unplugged, a "no" output is obtained during step 270 which causes the operation to proceed to step 272 to determine if a message is running. A "yes" output will be obtained during step 272 so long as a message is running and has not been completed, whether the message is the interactive portion of the message or the message selected by the user. A "yes" output during step 272 causes the operation to proceed to step 274 to copy the next quarter second of the message from the area of DRAM 24 for the channel to the appropriate one of the buffers 28 then being written into. As previously discussed, while one of these buffers is being read out to control the message appearing on speakers 62, the other one of the buffers will be loaded during step 274. From step 274, the MESSAGE mode routine is exited through step A and the operation returns to the INTERRUPT routine (FIG. 5).

When during step 272 it is determined that the message for the channel is completed, there being no further information for the message on disk 22, the operation proceeds to step 276 to turn off the volume for the corresponding speaker 62 in the manner previously discussed. The mode field for the channel in the speaker map is then set to IDLE mode during step 278. From step 278, the MESSAGE mode routine is exited through step A to return to the INTERRUPT routine.

Figure 9:
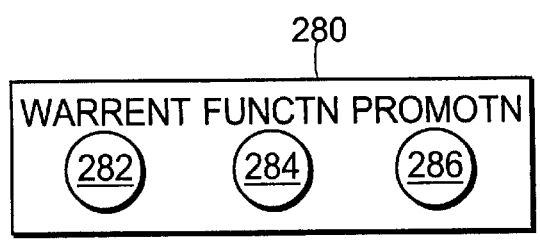
FIG. 9 illustrates an input switch for an alternative embodiment of the invention.

While in FIGS. 1 and 8 the desired message is selected in INTERACTIVE mode by sequentially providing a menu of message options at the speaker for the site, and operating a single button 66 when a desired option is presented, interactive selection of a desired option could also be provided by having an input device 280, such as that shown in FIG. 9, which device contains multiple buttons 282, 284 and 286, each of which is for a different message option. Thus, if the user were interested in warranty information on the product located at the site, the user would press button 282. This would be recognized by control computer 12 and would cause steps 264, 266 and 268 (FIG. 8) to be performed in the same manner described above.

Since speaker map 80 contains a memory pointer for each speaker or site, the messages read out for each site may begin at any 250 millisecond or one-quarter second interrupt and may continue at its own pace independent of messages which are being read out and played for other sites. The messages for the various sites may also be of different durations. The system, therefore, permits messages for any number of sites, including all of the sites, to be concurrently and asynchronously played at any given time.

If at any time products displayed at a particular site are changed so that a new message is desired at that site, all that is necessary is that the speaker be unplugged and then replugged. This puts the site in SETUP mode, permitting a new message to be selected and a new volume setting to be determined. The same procedure may be followed if the volume at a given site is either too high or too low. To facilitate the latter operation, the first message in MESSAGE SELECT mode might be "Volume" which, when selected, would transfer the channel into VOLUME mode.

While for the preferred embodiment, speakers have been utilized as the audio output devices, it is apparent that the teachings of this invention could be employed with other output devices such as headphones, TV monitors or some form of printer. Such alternative output device could be employed either in addition to or instead of the speakers 62 and possibly also in lieu of the amplifiers 60. The modifications in the system required to accommodate such different form of output device would be apparent to those skilled in the art. The output device might also be provided with a volume control which could be operated by the user. This would eliminate the need for VOLUME mode during the SETUP mode (FIG. 6). The analog output of the user volume control could be either applied directly to control the corresponding amplifier, or this analog output could be digitized and detected by computer 12 to make the appropriate volume setting entry in field 88 of the speaker map.

While in the discussion above, it has been assumed that the user is receiving an audio message concerning the product on the shelf, it is also possible for the message to be an actual sample of the product. For example, in a record store or record department, the site might contain a number of albums, tapes and/or disks. The user could interactively select the item of interest and the system would then play a short excerpt from the selected item. This mode of operation might require providing a higher fidelity channel than is otherwise required. For example, while a normal channel might be 8 bits wide and operate at 8 kilohertz, a high fidelity channel might be 16 bits wide and operate at 16 kilohertz. The operation in this mode would otherwise be substantially the same as that described above.

Further, while in the discussion above, audit trail information, for example from the activation list (FIG. 2C), was utilized primarily by being offloaded to central computer system 14, processor 20 could also be programmed to obtain a video, audio or printed output of selected audit trail information at the facility 10. Where it is desired to obtain audit trail information at a site, a hidden button could be provided at the site which, when operated by store personnel, would cause a reading out of selected stored audit trail information, for example the number of times the button for die site has been actuated during a given time period. A special jack could also be provided at die site to receive a speaker or earphone from store personnel, the selected audit information being provided in response to a plug being inserted in such jack.

One potential limitation for the preferred embodiment is that the control computer 12, if it is a relatively small computer such as a PC, must normally be dedicated to the interactive message function since the main line routine needs to be continuously run in order to transfer required information from hard disk 22 to DRAM 24. However, in some applications, the user may already have a computer which is being utilized for other functions and may not wish to purchase an additional computer dedicated to the interactive message generation function. In such applications, the number of sites could be reduced to something in the range of 8 to 16 sites, with the DRAM being either the existing DRAM or a slightly expanded DRAM. With this configuration, once a message is selected for a channel, the entire message is loaded into DRAM 20. Since network servicing could be handled through a periodic interrupt, the need for the mainline routine is eliminated. Processor 20 could therefore be utilized for other functions during most of its operating cycle.

Further, while computer 12 has been shown as a PC for the preferred embodiment, a special purpose computer could be provided for performing the functions of the control computer 12, special purpose hardware could be provided for this function, or the function could be performed by suitably programming a larger computer which is also being utilized to perform other functions at the site. With a DRAM or other working store operating at suitable speed, it may also be possible to eliminate the buffers 28 in a system. Thus, while the invention has been particularly shown and described above with reference to a preferred embodiment, the foregoing and other changes in form and detail may be made therein by one skilled in the art without departing from the spirit and scope of the invention.

What is claimed is:

1. A method for interactively providing selected messages from a common source at a plurality of separate sites, including:

initiating die read-out of a selected message to be provided at a site from an addressable store at said common source, which store contains a plurality of messages, in response to selective operation of an input device for the site, the reading-out of a message for each site for which the corresponding input device has been operated being initiated when the corresponding input device is operated and proceeding concurrently for all such sites at a rate for each site which depends on an information utilization rate for at least one output device corresponding to the site;

transmitting each read-out message to at least one output device associated with the site for the corresponding input device; and utilizing the at least one output device to output the selected message to the site.

2. A method as claimed in claim 1 wherein each said input device is selectively operable to select a message to be read out from the addressable store and to be provided at the associated output device.

3. A method as claimed in claim 2 including the step of selecting the message to be outputted for a site.

4. A method as claimed in claim 3 wherein said selecting step includes presenting a menu of message options at an output device associated with the site, and selectively operating the input device for the site to select a message from the menu.

5. A method as claimed in claim 1 wherein each said output device is an audio output device, and including the step of selectively controlling the audio volume of each said output device.

6. A method as claimed in claim 1 wherein said initiating step includes reading out each message a selected section at a time to a buffer corresponding to at least one output device for the site, and outputting message sections from each buffer to the corresponding output device at a rate for each buffer which depends on an information utilization rate for the output device corresponding to the buffer.

7. A method as claimed in claim 1 wherein each said message is at least a portion of a media selection.

8. A method as claimed in claim 7 wherein each said message is at least a portion of a musical selection, and wherein said output devices include audio output devices.

9. A method for interactively providing selected messages from a common source at a plurality of separate sites, including:

initiating the read-out of a selected message to be provided at a site from an addressable store at said common source which contains a plurality of messages in response to selective operation of an input device for the site, each message being read out a selected section at a time to a buffer corresponding to at least one output device for the site, outputting message sections from each buffer to the corresponding output device at a rate for each buffer which depends on an information utilization rate for the output device corresponding to the buffer, the reading-out of a message for each site for which the corresponding input device has been operated being initiated when the corresponding input device is operated and proceeding concurrently for all such sites; and utilizing the at least one output device to output the selected message to the site.

10. A method as claimed in claim 9 wherein each said input device is selectively operable to select a message to be read out from the addressable store and to be provided at the associated output device.

11. A method as claimed in claim 10 including the step of selecting the message to be outputted for a site.

12. A method as claimed in claim 11 wherein said selecting step includes presenting a menu of message options at an output device associated with the site, and selectively operating the input device for the site to select a message from the menu.

13. A method as claimed in claim 9 wherein each said message is at least a portion of a musical selection, and wherein said output devices include audio output devices.

14. An interactive system for providing from a common source selected messages at a plurality of separate sites including:

an addressable store at said common source which contains a plurality of messages;

a plurality of output devices, there being at least one of said output devices corresponding to each site;

an input device located at each site; and controls responsive to the selective operation of the input device for one of said sites for initiating the reading out of a selected message to be provided at the site from the addressable store, the reading out of a message for each site for which the corresponding input device has been operated being initiated when the corresponding input device is operated and proceeding concurrently for all such sites at a rate for each site which depends on an information utilization rate for the corresponding output device;

each read out message being transmitted to at least one output device associated with the site for the operated input device, the output device outputting the selected message in response to receipt of the readout message.

15. A system as claimed in claim 14 wherein each said input device is selectively operable to select a message to be read out from the addressable store and to be provided at the associated output device.

16. A system as claimed in claim 15 wherein each said input device is operable in a different way for each message to be read out, said controls being responsive to the way the input device is operated for selecting the message sent to the corresponding output device.

17. A system as claimed in claim 15 wherein said controls present a menu of message options at an output device associated with a site, and are responsive to the selective operation of the input device for the site for selecting a message from the menu.

18. A system as claimed in claim 14 wherein said output device is an audio output device; and wherein said controls are operative in response to selected inputs from the input device for one of said sites to control the audio volume of an associated output device.

19. A system as claimed in claim 14 wherein said controls include a buffer storing selected message segments for at least each output device, the buffer for an output device being loaded from the addressable store with additional message segments for the output device when at least a predetermined percentage of the buffer for the output device is empty.

20. A system as claimed in claim 14 wherein each said message is at least a portion of a media selection.

21. A system as claimed in claim 20 wherein each said message is at least a portion of a musical selection, and wherein said output devices include audio output device.

22. An interactive system for providing from a common source selected messages at a plurality of separate sites including:

an addressable store at said common source which contains a plurality of messages;

a plurality of output devices, there being at least one of said output devices corresponding to each site;

an input device located at each site;

a buffer associated with each said output device; and controls operative in response to selective operation of a said input device for initiating the reading out of a message corresponding to said selective operation, a selected message section at a time, from said addressable store to the buffer for at least one output device corresponding to the site for the operated input device, messages being read from each buffer to operate the corresponding output device at a rate corresponding to an information utilization rate for the output device, reading out of messages for each site for which an input device has been operated proceeding concurrently and asynchronously for all such sites.

23. A system as claimed in claim 22 wherein each said input device is selectively operable to select a message to be read out from the addressable store and to be provided to the buffer for the associated output device.

24. A system as claimed in claim 23 wherein each said input device is operable in a different way for each message to be read out, said controls being responsive to the way the input device is operated for selecting the message sent to the buffer for the corresponding output device.

25. A system as claimed in claim 23 wherein said controls present a menu of message options at an output device associated with a site, and are responsive to the selective operation of the input device for the site for selecting a message from the menu.

26. A system as claimed in claim 22 wherein said output device is an audio output device; and wherein said controls are operative in response to selected inputs from the input device for one of said sites to control the audio volume of an associated output device.

27. A system as claimed in claim 22 wherein each said message is at least a portion of a musical selection, and wherein said output devices include audio output devices.

* * * * *

UNITED STATES PATENT AND TRADEMARK OFFICE
CERTIFICATE OF CORRECTION

PATENT NO. : 6,366,960 B1  Page 1 of 1
APPLICATION NO. : 09/710687
DATED : April 2, 2002
INVENTOR(S) : Calvert T. Hawkes It is certified that error appears in the above-identified patent and that said Letters Patent is hereby corrected as shown below:

Line 65 of Col. 15 on page 17 (line 4 of claim 1) as printed reads "initiating die read-out..." and should read "initiating the read-out...".

Line 8 of Col. 18 (line 3 of claim 21) on page 18 reads "wherein said output devices include audio output device" and should read "wherein said output devices include an audio output device".

Signed and Sealed this

Thirtieth Day of June, 2009

JOHN DOLL
*Acting Director of the United States Patent and Trademark Office*